United States Patent [19]

Halén

[11] Patent Number: 5,442,965
[45] Date of Patent: Aug. 22, 1995

[54] TORQUE DELIVERING POWER TOOL

[75] Inventor: Lars Halén, Stockholm, Sweden

[73] Assignee: Atlas Copco Controls AB, Tyreso, Sweden

[21] Appl. No.: 162,663

[22] Filed: Dec. 3, 1993

[30] Foreign Application Priority Data

Dec. 7, 1992 [SE] Sweden ................................ 9203670

[51] Int. Cl.⁶ ............................................... G01L 1/00
[52] U.S. Cl. ............................. 73/862.22; 73/862.23; 73/791
[58] Field of Search .......... 73/862.21, 862.22, 862.23, 73/862.382, 862.29, 761

[56] References Cited

U.S. PATENT DOCUMENTS

| | | | |
|---|---|---|---|
| 3,596,718 | 7/1969 | Fish | 73/761 |
| 3,911,736 | 10/1975 | Miller | 73/862.22 |
| 3,920,082 | 11/1975 | Dudek . | |
| 4,030,353 | 6/1977 | Shutt | 73/862.23 |
| 4,060,137 | 11/1977 | Bickford et al. | 73/862.23 |
| 4,384,493 | 5/1983 | Grunbaum | 73/862.29 |
| 4,503,713 | 3/1985 | Obayashi et al. | 73/862.22 |
| 4,989,459 | 2/1991 | Faber, Jr. | 73/862.23 |

FOREIGN PATENT DOCUMENTS

| | | |
|---|---|---|
| 0264034 | 4/1988 | European Pat. Off. . |
| 0386895 | 9/1990 | European Pat. Off. . |
| 1254380 | 7/1965 | Germany . |
| 3804043A1 | 7/1989 | Germany . |

OTHER PUBLICATIONS

Patent Abstracts of Japan, vol. 7, No. 221 (M-246) (1366) Sep. 30, 1983 & JP-A-58 114 830 (Nitsutou Seikou K.K.).

*Primary Examiner*—Richard E. Chilcot, Jr.
*Assistant Examiner*—R. L. Biegel
*Attorney, Agent, or Firm*—Frishauf, Holtz, Goodman & Woodward

[57] ABSTRACT

A torque delivering power tool for tightening threaded joints to a desired final pretension level, has a motor (11), a power transmission (12) with a reduction gearing (13) and an output shaft (14). A first torque transducer (19) associated with the power transmission (12) is exposed to torque magnitudes corresponding to delivered torque magnitudes up to the desired final pretension level, and an external second torque transducer (20) is arranged to be exposed to load magnitudes which correspond to torque output magnitudes up to a snug level only.

10 Claims, 5 Drawing Sheets

TORQUE DELIVERING POWER TOOL

BACKGROUND OF THE INVENTION

The invention relates to a torque delivering power tool for tightening threaded joints to a desired final pretension level.

In particular, the invention concerns a power tool of the above type having a housing, a rotation motor, an output shaft connectable to a threaded joint to be tightened, power transmitting means connecting the motor to the output shaft, and a first torque transducer associated with the power transmitting means and exposed to torque magnitudes corresponding to delivered torque magnitudes up to the desired final pretension level.

A problem concerned with torque delivering power tools of the above type is the difficulty to obtain a signal from the torque transducer that reliably indicates both the torque magnitudes at the desired final pretention level and minor deviatons in the torque resistance during the low torque running down phase. It is most desirable to detect such small torque deviations since they indicate occurring thread damage, misalignment between threaded parts, or other faults that if not detected and the tightening is not stopped may cause serious damage to the screw joint and the parts being assembled.

The main object of the invention is to create a torque delivering power tool having an improved torque sensing means by which the above problem is solved.

BRIEF DESCRIPTION OF THE DRAWINGS

A preferred embodiment of the invention is described below with reference to the accompanying drawings.

DETAILED DESCRIPTION

Figure 1:
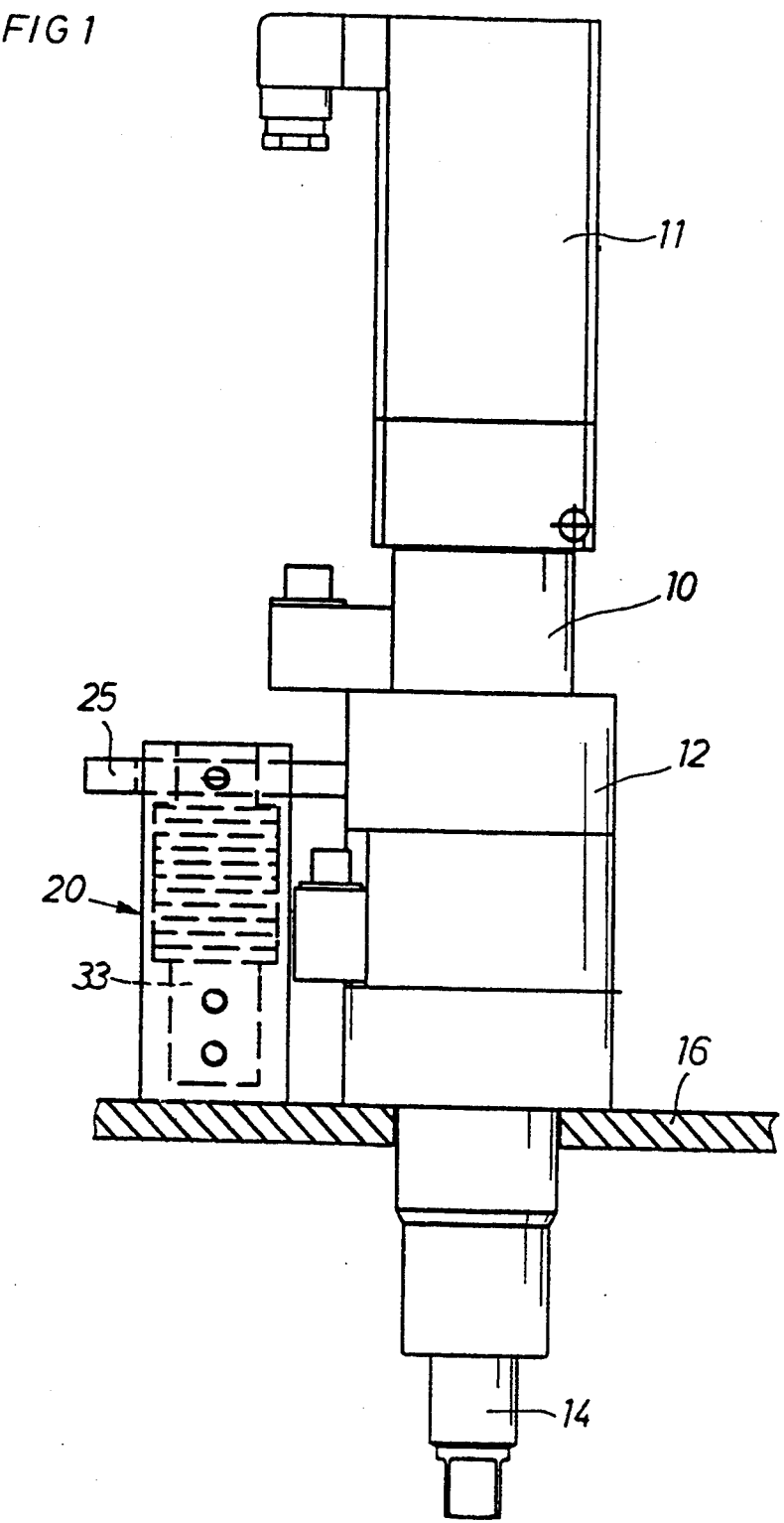
FIG. 1 shows a side view of a power tool according to the invention.
Figure 2:
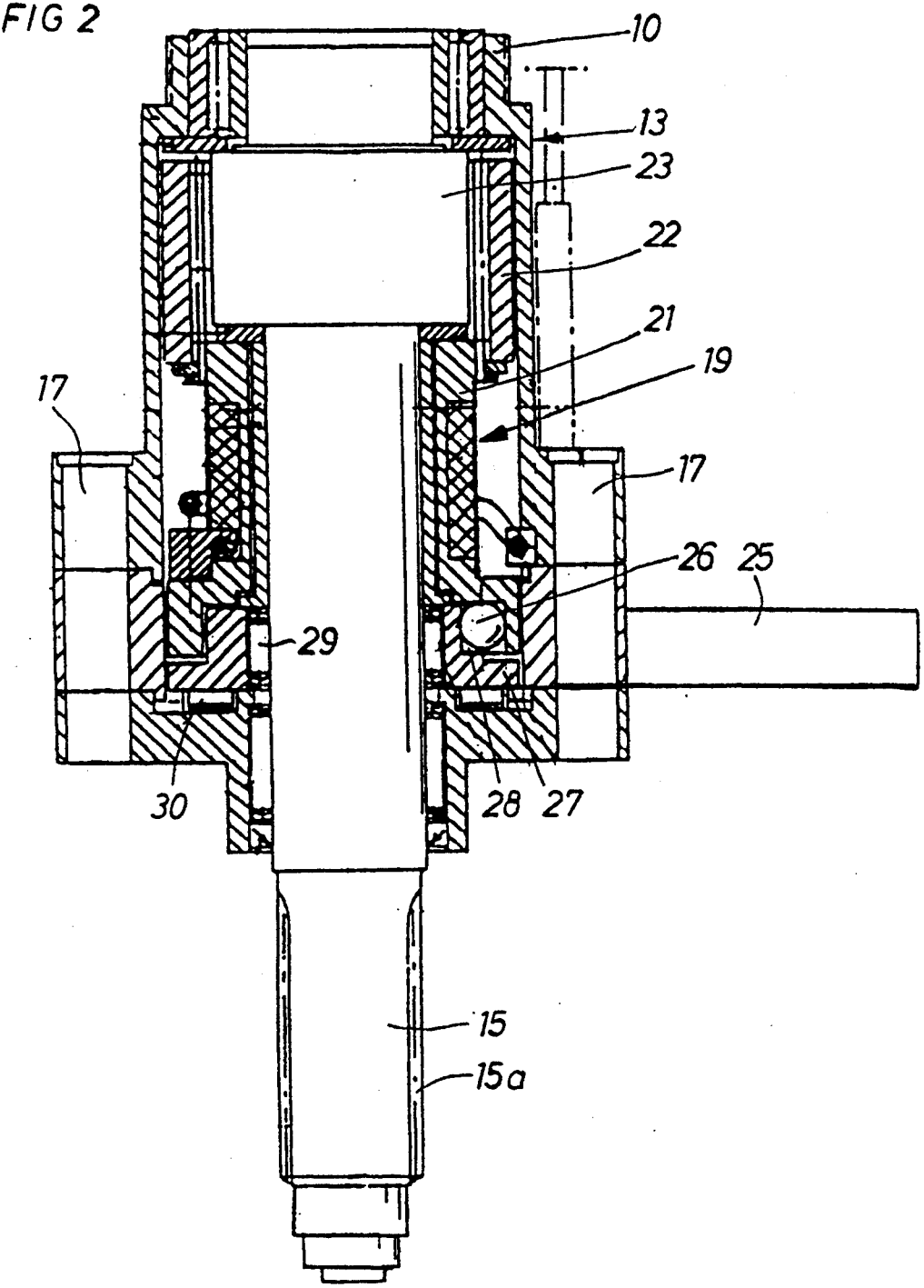
FIG. 2 shows, on a larger scale, a longitudinal section through the front part of the power tool in FIG. 1.

The power tool shown in FIGS. 1 and 2 comprises a housing 10 in which is mounted an electric rotation motor 11, a power transmission 12 including a reduction gearing 13, an intermediate drive spindle 15 and an output shaft 14. As shown in FIG. 2, the spindle 15 is formed with splines 15a at its forward end for drive connection with the output shaft 14 via a telescopically flexible shaft joint (not shown). The tool housing 10 is secured to a support structure 16 by means of bolts extending through bores 17. See FIGS. 2 and 3.

The tool is provided with two separate torque transducers 19, 20. A first torque transducer 19 is located inside the housing 10, whereas the second torque transducer 20 is located outside the housing 10 and secured to the support structure 16.

The first torque transducer 19 is mounted on a sleeve 21 which at its upper end is connected to the ring gear 22 of a planetary gear 23 which forms part of the reduction gearing 13. Accordingly, the first torque transducer 19 is exposed to the reaction torque (torsional stress in the sleeve 21 caused by the reaction torque) which is transferred by the ring gear 22 to the tool housing 10. This reaction torque reflects directly the output torque delivered via the spindle 15 and the output shaft 14.

However, the lower end of the sleeve 21 is not connected directly to the tool housing 10 but is connected to a radially extending reaction bar or arm 25 via a coupling comprising three balls 26. See FIG. 2. For that purpose the arm 25 is provided with a coupling ring 27 which is formed with pockets 28 for partly receiving the balls 26 and which is journalled relative to the spindle 15 by a roller bearing 29. Corresponding pockets 24 are provided in the sleeve 21. A thrust bearing 30 forms an axial support for the coupling ring 27. The arm 25 extends out of the housing 10 through a lateral opening (not shown) to take support against the support structure 16 via the second torque transducer 20.

Figure 4:
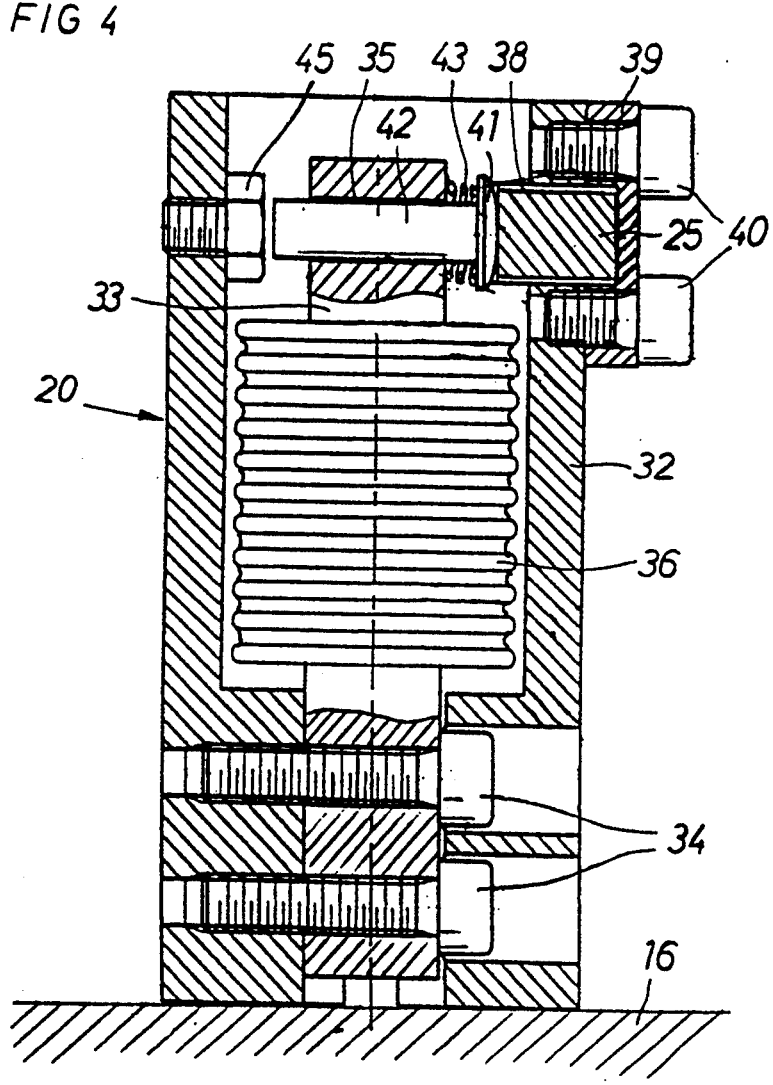
FIG. 4 shows, on a still larger scale and partly in section, the external second torque transducer.

As illustrated in FIG. 4, the second torque transducer 20 comprises a reaction support member in the form of a tubular casing 32 which is rigidly secured to the support structure 16 and which encloses a sensing means in the form of a load cell 33. At its lower end, the load cell 33 is rigidly clamped to the casing 32 by two transverse screws 34, whereas the upper end of the load cell 33 is formed with a transverse through bore 35. At its middle portion, the load cell 33 carries a bellows 36 for protection of the bending load indicating means, such as strain gauges (not shown). In respect of the load indicating means, the load cell 33 is of a conventional design available on the market and is therefore not described in further detail.

At its upper end, the casing 32 is formed with a lateral opening 38 for receiving the arm 25. The opening 38 is covered by an arm retaining element 39 secured to the casing 32 by two screws 40.

The arm 25 is in contact with the head 41 of a bolt 42 which is movably guided in the transverse bore 35 in the load cell 33. A spring 43 is located between the head 41 of the bolt 42 and the load cell 33, and an abutment stud 45 on the casing 32 is arranged to limit the distance of movement of the bolt 42 to 1-2 mm. This means that the force exerted by the arm 25 on the load cell 33 is limited to the force developed by the spring 43 when compressed that limited distance. That part of the reaction torque transferred by the arm 25 that exceeds the compressing force of the spring 43 is transferred directly to the casing 32 via the stud 45.

Figure 3:
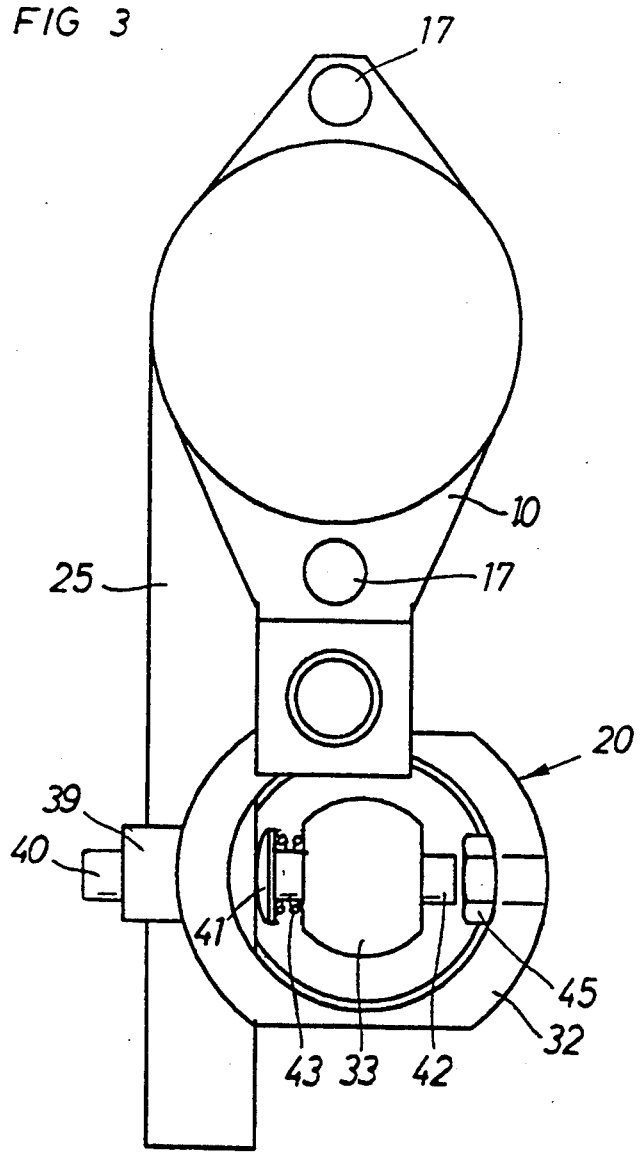
FIG. 3 shows a rear end view of the power tool shown in FIG. 1.

The spring 43 could either be a coil type wire spring as illustrated in FIGS. 3 and 4, or a Belleville-type washer spring device which comprises one or more Belleville-type washer springs.

Figure 5:
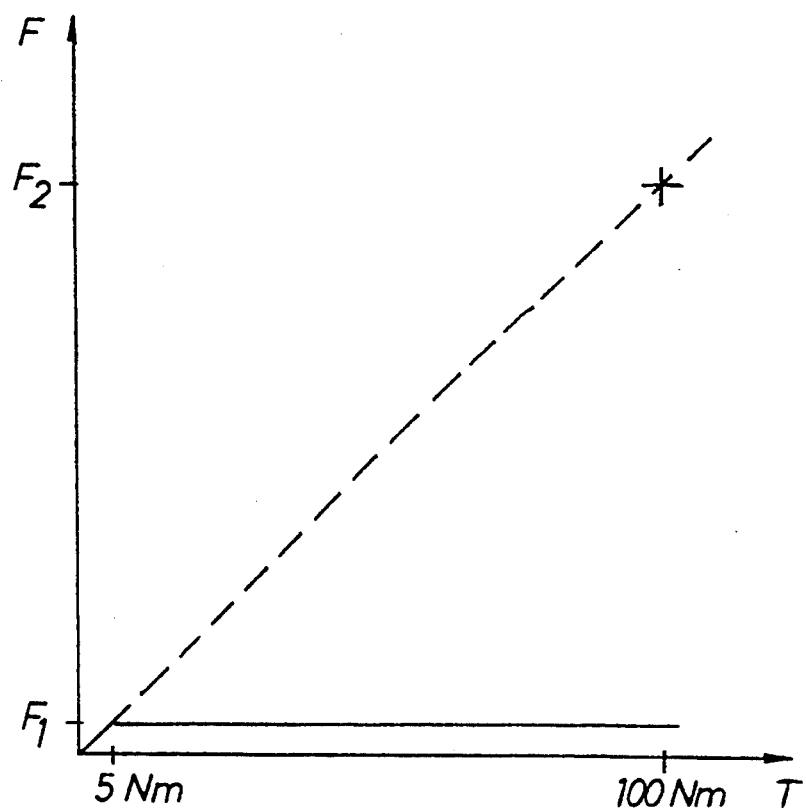
FIG. 5 shows a diagram illustrating the load exposure on the second torque transducer.

In the diagram in FIG. 5, there is illustrated the load F to which the sensing means, i.e. the load cell 33, of the second torque transducer 20 is exposed at different torque levels T. The dash line shows the load transferred by the reaction arm 25 when the output torque is increased from zero to 100 Nm. At 100 Nm, the load is $F_2$.

The horizontal solid line in the diagram of FIG. 5 illustrates the limited load to which the load cell 33 is exposed at varying output torque. The load limit $F_1$ is chosen so as to correspond to an output torque magnitude of 5 Nm or less, i.e. less than 5% of a target torque of 100 Nm, which corresponds to a torque snug level indicating the end of the running down phase of the tightening process.

By employing a second torque transducer which is protected from all loads exceeding a certain magnitude, it is made possible to use such a sensitive transducer that is able to indicate even very small torque variations, such as tenths of 1 Nm. This is of great importance in many cases where the end result of a tightening process may be influenced even by minor faults and deviations in the screw joint parts.

Both of the torque transducers are connected to a process control and monitoring means of any commercially available type. The signal obtained from the first built-in (internal) transducer 19 is used to shut off the power tool as the desired final pretension torque level is reached, whereas the signal obtained from the second transducer is used both for post tightening quality checking of the screw joint and for monitoring of the running down phase and initiating of premature tightening shut-off in cases of serious faults on the screw joint parts.

I claim:

1. A torque delivering power tool for tightening threaded joints to a desired pretension level, comprising:
    a housing (10);
    a rotation motor (11);
    an output shaft (14) connected to a threaded joint to be tightened;
    power transmitting means (12, 13, 15) in said housing (10) and connecting said motor (11) to said output shaft (14);
    a first torque transducer (19) in said housing (10) and coupled to said power transmitting means (12, 13, 15), said first torque transducer (19) producing a signal which is a function of torque magnitudes which in turn are a function of output torque magnitudes up to said desired pretension level;
    a radially extending reaction bar (25) coupled to said power transmitting means and which is displaceable responsive to torque variations of the delivered output torque;
    a second torque transducer (20, 33) mounted outside of said housing (10) and coupled to said reaction bar (25), and said second torque transducer (20, 33) producing a signal responsive to displacements of said reaction bar (25), which displacements are a function of load magnitudes which in turn are a function of output torque magnitudes up to a predetermined torque snug level which is substantially lower than said pretension level.

2. The power tool of claim 1, wherein:
    said radially extending reaction bar (25) has a portion extending laterally out of said housing (10); and
    said second torque transducer (20, 33) is connected between said portion of said reaction bar (25) and an immovable reaction support (32).

3. The power tool of claim 2, further comprising:
    spring means (43) coupled as a load transmitting means between said reaction bar (25) and said second torque transducer (20, 33); and
    abutment means (45) rigidly connected to said reaction support (32) to transfer a reaction bar load directly to said reaction support (32) at output torque magnitudes above said torque snug level, thereby limiting a load on said second torque transducer (20, 33).

4. The power tool of claim 3, wherein said spring means (43) comprises at least one Belleville-type washer spring.

5. The power tool of claim 2, wherein:
    said power transmitting means comprises a planetary reduction gear mechanism (23) which includes a ring gear (22) which is rotatable relative to said housing (10); and
    said reaction bar (25) is coupled to said rotatable ring gear (22) of said planetary reduction gear (23).

6. The power tool according to claim 5, wherein said first torque transducer (19) is coupled to said rotatable ring gear (22).

7. The power tool of claim 3, wherein:
    said power transmitting means comprises a planetary reduction gear mechanism (23) which includes a ring gear (22) which is rotatable relative to said housing (10); and
    said reaction bar (25) is coupled to said rotatable ring gear (22) of said planetary reduction gear (23).

8. The power tool according to claim 7, wherein said first torque transducer (19) is coupled to said rotatable ring gear (22).

9. The power tool of claim 4, wherein:
    said power transmitting means comprises a planetary reduction gear mechanism (23) which includes a ring gear (22) which is rotatable relative to said housing (10); and
    said reaction bar (25) is coupled to said rotatable ring gear (22) of said planetary reduction gear (23).

10. The power tool according to claim 9, wherein said first torque transducer (19) is coupled to said rotatable ring gear (22).

* * * * *